United States Patent [19]

Christenson

[11] Patent Number: 4,860,481
[45] Date of Patent: Aug. 29, 1989

[54] SOLID GRAPHITE ROD TIP

[75] Inventor: Harlan B. Christenson, Spirit Lake, Iowa

[73] Assignee: Berkley, Inc., Spirit Lake, Iowa

[21] Appl. No.: 181,930

[22] Filed: Apr. 15, 1988

[51] Int. Cl.$^4$ .............................................. A01K 87/00
[52] U.S. Cl. ..................................... 43/18.1; 43/18.5; 156/190; 156/194
[58] Field of Search ......................... 43/18.1, 18.5, 24; 273/80 R, 80 B, DIG. 3, DIG. 7; 156/175, 181, 189, 190, 194

[56] References Cited

U.S. PATENT DOCUMENTS

| | | | |
|---|---|---|---|
| 3,835,569 | 9/1974 | Gould, III et al. | 43/18 |
| 4,015,360 | 4/1977 | Herter | 43/18.5 |
| 4,043,074 | 8/1977 | Airhart | 43/18 |
| 4,061,806 | 12/1977 | Lindler | 43/18.1 |
| 4,155,791 | 5/1979 | Higuchi | 156/194 |
| 4,355,061 | 10/1982 | Zeigler | 428/36 |
| 4,422,259 | 12/1983 | Shimano | 43/18.5 |
| 4,464,856 | 8/1984 | Holden | 43/18.5 |
| 4,685,241 | 8/1987 | Foote et al. | 43/18.5 |

FOREIGN PATENT DOCUMENTS 2119611 11/1983 United Kingdom ................ 43/18.5

Primary Examiner—Nicholas P. Godici
Assistant Examiner—William Scott Andes
Attorney, Agent, or Firm—Faegre & Benson

[57] ABSTRACT

A flexible fishing rod is described having a cross section which tapers from a large butt end to a small tip end. The rod has a hollow section extending along the rod axis from the butt end to a solid tip section formed by compression of the pattern used to make the rod.

7 Claims, 1 Drawing Sheet

SOLID GRAPHITE ROD TIP

FIELD OF THE INVENTION

This invention is directed to resinous fiber-reinforced rods. More particularly, this invention relates to a tapered flexible fishing rod having a rod body that includes a hollow interior portion and a solid tip portion, the solid tip portion being an integral part of the rod body.

BACKGROUND OF THE INVENTION

Fiber-reinforced fishing rods are generally made by wrapping a tapered steel mandrel with fibers. An epoxy or other curable resin is used as a binder. The fibers and resin may be formed directly on to the mandrel or may be available in the form of a woven or nonwoven matrix which is cut to a suitable pattern and wrapped around the mandrel. The rod is cured as required, after which the mandrel is removed leaving a lightweight, hollow rod blank. The rod blank is then ready for final finishing.

Previous teachings indicate that fishing rods constructed in this fashion are very resilient upon flexing. For example, U.S. Pat. No. 4,043,074 to Airhart shows a hollow rod body composed of a specific arrangement of laminations of a plurality of fiber-reinforced resin plies. The disclosed pattern of laminations results in a rod which resists breakage when the rod is flexed during the casting motion or when a fish is reeled in.

Similarly, U.S. Pat. No. 4,685,241 to Foote et al. shows another fiber-reinforced fishing rod with good bending strength due to a pattern sheet containing a layer of chopped fiber material.

While rods of these structures have numerous benefits, they are still vulnerable to breakage. Breakage is not limited to the exertion of flexing forces. Indeed, the somewhat delicate tip portion of the rod is the most common area of breakage as it frequently encounters external crushing and impact forces. For example, hollow tip rods often break when they are stepped upon or slammed in doors, or if the hollow tip sharply strikes a hard surface. Breakage is also common during shipping as the rod shifts within its container.

Generally, the ease of breakage of any hollow tubular structure is due to the lack of internal support or reinforcement for the exterior surface. In a tapered rod blank, damage is frequently localized to the tip segment because the walls of that portion of the rod are normally manufactured significantly thinner than the walls of the other portions of the blank.

SUMMARY OF THE INVENTION

We have now discovered that a flexible, fiber-reinforced fishing rod can be constructed to include a hollow interior portion and a solid tip portion which is an integral part of the rod body. This novel fishing rod has up to about four to six times the compressive strength as conventional hollow rod tips and more than twice the impact resistance. At the same time, the hollow interior portion throughout most of the length of the rod allows it to retain its flexible and lightweight character.

Briefly, fishing rods according to the present invention are formed in the following manner. A conventional mandrel is shortened by removing a portion of the tapered tip portion of the mandrel that is generally equal to the desired length of the solid tip portion. The remaining tip portion of the mandrel is gently tapered to a needle point.

The shortened mandrel is laid on a conventional pattern, which has been cut to accommodate the original full length uncut size of the mandrel, with the butt end of the mandrel aligned even with the butt end of the pattern. A dowel is placed on the pattern in axial alignment with the shortened mandrel. The pattern is then wrapped around the mandrel and the axially aligned dowel in the usual manner such that a portion of the dowel extends outside of the tip end of the pattern. After wrapping, the dowel is withdrawn, leaving a hollow core section in the tip portion. The mandrel and pattern are wrapped with tape such that the tape layer axially compresses the hollow tip section of the pattern material to form a solid tip. The rod is then cured and the shortened mandrel removed, leaving the rod blank ready for final finishing.

DETAILED DESCRIPTION OF THE PREFERRED EMBODIMENT

Figure 1:
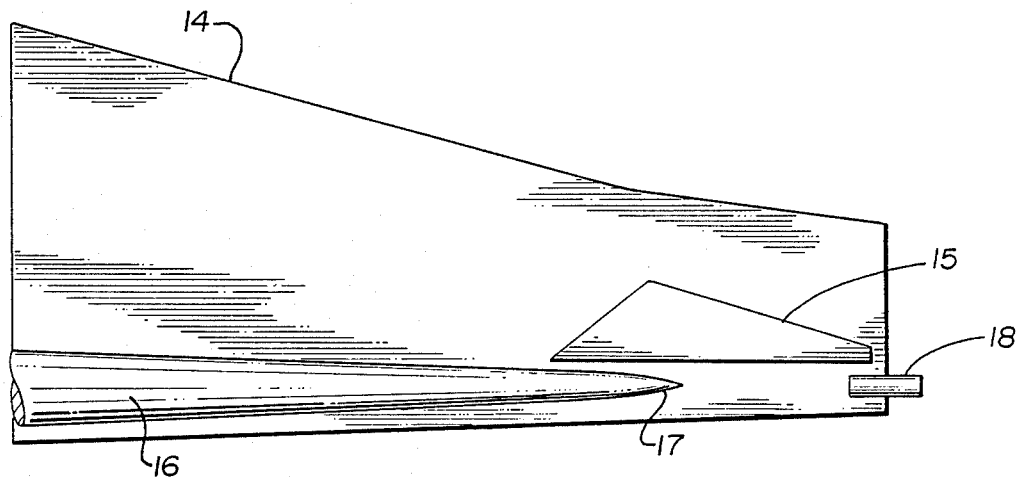
FIG. 1 is a plan view of the pattern and a supplemental pattern, mandrel and dowel prior to formation of the rod blank.

Referring now to FIG. 1, a mandrel 16, is shown aligned along an edge of a large pattern 14. A supplemental pattern 15 is positioned as shown between the tip end 17 of mandrel 16 and the tip end of pattern 14.

Mandrel 16 may be prepared by removing a portion of the tapered tip end of a conventional mandrel that, when used in prior art processes, extends through the entire rod blank. A dowel 18, is shown positioned at the tip end of the pattern 14 in axial alignment with the shortened mandrel 16.

In the preferred embodiment shown, the shortened mandrel 16 used has been prepared by removing approximately 12.5 inches from the tapered tip end of a conventional mandrel approximately 6 ft. long. The last four inches of the tip of mandrel 16 have been further gently tapered to a needle point 17 to insure a smooth transition in the exterior profile from the hollow rod blank to its solid tip end 32.

Dowel 18 is utilized to provide a core to allow pattern 14 to be rolled onto mandrel 16 without the unsupported distal tip portion of the pattern becoming knotted. In the preferred embodiment, dowel 18 is a rod or wire of a small diameter, approximately 0.100 inches and approximately 1½ inches long. The mandrel 16 and dowel 18 are positioned atop pattern 14 with one side of pattern 14 aligned with the axis of mandrel 16. Dowel 18 is coaxially aligned with mandrel 16 and has only a portion of its length overlying the tip end of the pattern 14. In order to assure a smooth transition of the rod surface from the solid to the hollow portion of the rod, a supplemental pattern 15 may be positioned to fill the space that would otherwise be formed in pattern 14 after being rolled on mandrel 16, both in the vicinity of the pointed tip 17 of mandrel 16 and between mandrel 16 and dowel 18. Pattern 15 has a tapered top edge as shown and a tapered edge adjacent tip 17 of mandrel 16. Patterns 14 and 15 are then rolled onto mandrel 16 and dowel 18 as they are rolled across patterns 14 and 15 while their axial alignment is maintained.

The sheet material from which patterns 14 and 15 are cut generally comprises a resinous matrix with reinforcing fibers. The matrix is preferably a thermosetting resin, heat curable to yield a hard tough resinous product. Epoxy resins, those usually commercially available in fiber-reinforced laminar materials, are preferred. Other suitable resins include polyesters, organic solvent soluble polyamides, and high melting fluoro-polymers, such as polytetrafluorethylene.

The reinforcing fibers in the resinous matrix are, in the preferred embodiment, longitudinally aligned graphite fibers. Suitable graphite fibers for use in this invention are commercially available under the tradenames Celion and Thornel, from Narmco Materials, Inc., a subsidiary of Celanese Corp. Suitable prepackaged material for present purposes is available under the trade name Rigidite, also from Narmco Materials, Inc.

The epoxy resin-graphite reinforced material should suitably have a resin content of $40 \pm 3\%$ by weight, a gel time at 275° F. of nominally 4 minutes, and a graphite content of $140 \pm 5$ grams per square meter. The thickness of a single cured ply should be nominally 0.0057 inch, when cured under a pressure of 8 to 10 PSI, and nominally 0.0046 inch, when cured under a pressure of 85 to 100 PSI.

Other pattern materials are also possible. The only requirement for the chosen pattern material is that it consist of a laminar fiber-reinforced resinous matrix. The patterns are cut from the chosen material in the size and shape appropriate to the desired rod body and to the type of rod action desired. Suitable patterns for use are generally cut in the right triangular form of pattern 14 as illustrated in FIG. 1. A plurality of patterns 14 and 15 may also be rolled onto the mandrel and dowel.

Figure 2:
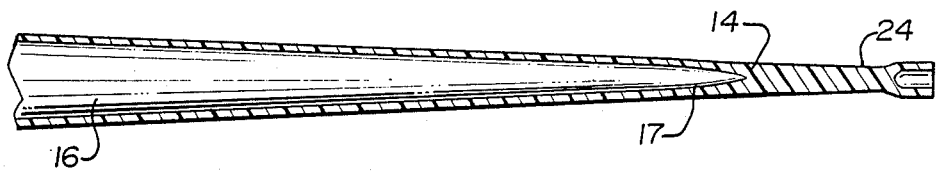
FIG. 2 is an elevational view with part in section, cut vertically along the longitudinal axis showing the rod blank formed on the mandrel after removal of the dowel.

After the pattern is rolled, the dowel segment 18 is withdrawn, leaving a hollow section 24 in the extreme distal tip portion. FIG. 2 is a cutaway view of the taped mandrel 16 with the dowel removed. Removal of the dowel leaves a tip section 24 with a very small axial hole. The wrapped mandrel 16 with the hollow tip section 24 is then taped. Preferably, the mandrel is taped on a horizontal taping machine which applies a layer of polypropylene tape 20 over the rolled pattern 14.

Not only does the overlapping taped layer hold the pattern securely in place for curing, but it also axially compresses the hollow tip section 24 into a solid tip 32.

Figure 3:
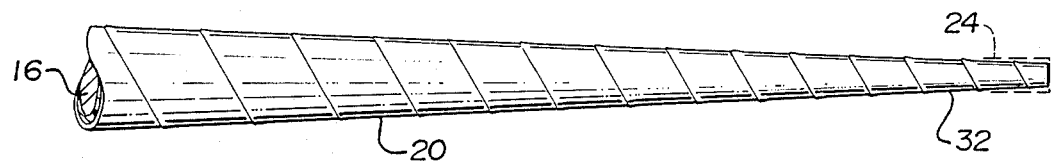
FIG. 3 is a plan view of the rod tip after wrapping with tape.

FIG. 3 shows the mandrel and the pattern wrapped with an overlapping layer of polypropylene tape 20. The phantom lines indicate the area once occupied by the hollow tip section 24 which has now been compressed into a solid tip 32.

The mandrel-pattern-tape-overwrap combination is now cured. The method of curing naturally depends upon the choice of pattern material. With a preferred pattern of epoxy-graphite fiber, an appropriate curing cycle would involve heating the combination to 170° F.$\pm 5°$ F. for 60 minutes, then raising the temperature to 275° F. and maintaining this higher temperature for 60 minutes. These two curing temperatures can be attained at a heating elevation rate of 1 F. to 10 F. degrees per minute. After completing the chosen curing process, the mandrel and the tape overwrap are removed leaving a rod body 28 which is ready for final finishing.

Figure 4:
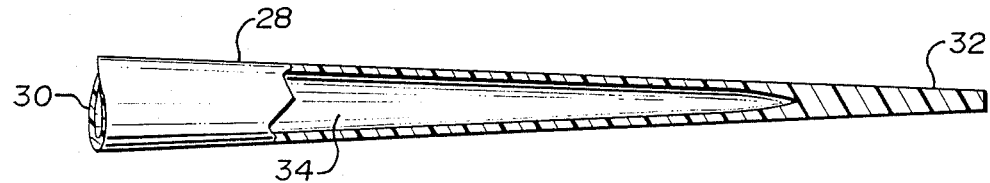
FIG. 4 is a partially cut-away elevational view of the finished rod blank.

FIG. 4 depicts a longitudinal cross section of a completed rod body 28 produced by this method. The rod body 28 is tapered with a generally circular exterior cross-section. The rod body 28 tapers from a large diameter butt end 30 to a small diameter tip end 32. The rod body 28 has a hollow interior portion 34 extending along the rod body axis from the butt end 30 to a solid tip end 32. The solid tip end 32 is an integral part of the rod body 28.

If the supplemental pattern 15 is used to compensate for the taper of mandrel 16, there is no noticeable surface joint in the transition of the exterior profile of the final rod body from the hollow interior portion 34 to the solid tip end 32.

The compression strength and impact resistance of the rod bodies of the present invention were tested. As shown below, the results demonstrated that the solid rod tips of the present invention have up to 6 times as much compressive strength as conventional rod tips and more than twice the impact resistance.

COMPRESSIVE STRENGTH TEST

Twenty rods of the same model were used for this test. Ten of the rods had solid tips prepared according to the present invention. Ten of the rods were conventional hollow tipped rods. Two 1" long specimens were cut from each rod tip section.

A Sintech testing machine was used to test the compressive strength of the rod tip samples. The sample was laid horizontally on a rigid flat plate. A 7/16" O.D. flat ended cylinder descended at a rate of ½ inches per minute to trap the middle portion of the sample between the two flat parallel surfaces. The results were that the solid tips failed at about 675 pounds of compression while the hollow tips failed at about 110 pounds.

IMPACT RESISTANCE TEST

Twenty fishing rods of the same model were used for this test. Ten of the rods had solid tips, according to the present invention, while ten were hollow tip rods.

The butt end of the rod blank was mounted on a flat surface. The tip portion of the rod was raised to a predetermined striking distance above a sharp striking block and released. The striking distance was increased until the rod tip was broken when it struck the striking block. The striking distance necessary to break the conventional hollow tip fishing rod was typically 5" while the solid tip fishing rods survived 11½" striking distances which were maximum distance that could be selected for the tests.

While specific embodiments of the invention have been shown and described in detail to illustrate the application of the inventive principles, it will be understood to those skilled in the art that the invention may be embodied otherwise without departing from such principles.

What is claimed is:

1. A method for making a fishing rod having an exterior cross-section which tapers from a larger butt end to a smaller tip end, and having a hollow body section and a solid tip section, comprising:

forming a shortened mandrel from a conventional mandrel, by removing a portion of a tapered tip end of the conventional mandrel that is slightly longer than the desired length of the solid tip section;

aligning the shortened mandrel on a pattern sheet comprised of a fiber reinforced laminar resin material, said pattern having a tip end and a butt end, said butt end of the pattern cut for aligning with the butt end of the original full length of the conventional mandrel and the tip end cut for aligning with the tip end of the conventional mandrel;

aligning the shortened mandrel along the pattern, with a butt end of the shortened mandrel generally adjacent the butt end of the pattern, the shortened mandrel extending longitudinally along the pattern and the tip end of the mandrel aligned adjacent the tip end of the pattern;

aligning a dowel along the pattern in axial alignment with and spaced from the shortened mandrel and extending from the tip end of the mandrel along the pattern and beyond the tip end of the pattern;

rolling the pattern around the axially aligned shortened mandrel and dowel such that the dowel extends beyond the tip end of the rolled pattern;

withdrawing the dowel, thereby forming a hollow tip section in the tip end of the rod;

wrapping the mandrel and pattern with an overlapping layer of tape, such that the overlapping tape layer compresses the hollow tip section of the pattern to form a solid tip section; and curing the rod and removing the mandrel.

2. The method of claim 1, wherein the fibers in the pattern are graphite.

3. The method of claim 1, wherein the resin material in the pattern is a heat curable epoxy resin.

4. The method of claim 1 wherein a supplemental pattern is applied to provide a smooth transition surface in the portion of the rod between the tip of the shortened mandrel and the dowel.

5. A one-piece fishing rod of unitary construction formed from a fiber reinforced laminar resin material, the rod having a generally circular cross-section tapering from a large butt end to a small tip end, and having a hollow body section extending along the rod axis from the butt end to a solid tip section, said solid tip section being a unitary part of the rod and forming a smooth exterior profile therewith, said solid tip section providing improved compressive strength and impact resistance to the tip end of the rod, while maintaining the flexibility thereof.

6. The fishing rod according to claim 5, wherein the resin of the fiber-reinforced laminar resin material is a heat curable epoxy resin.

7. The fishing rod according to claim 5, wherein the fibers of the fiber-reinforced laminar resin material are graphite.

* * * * *